United States Patent Office.

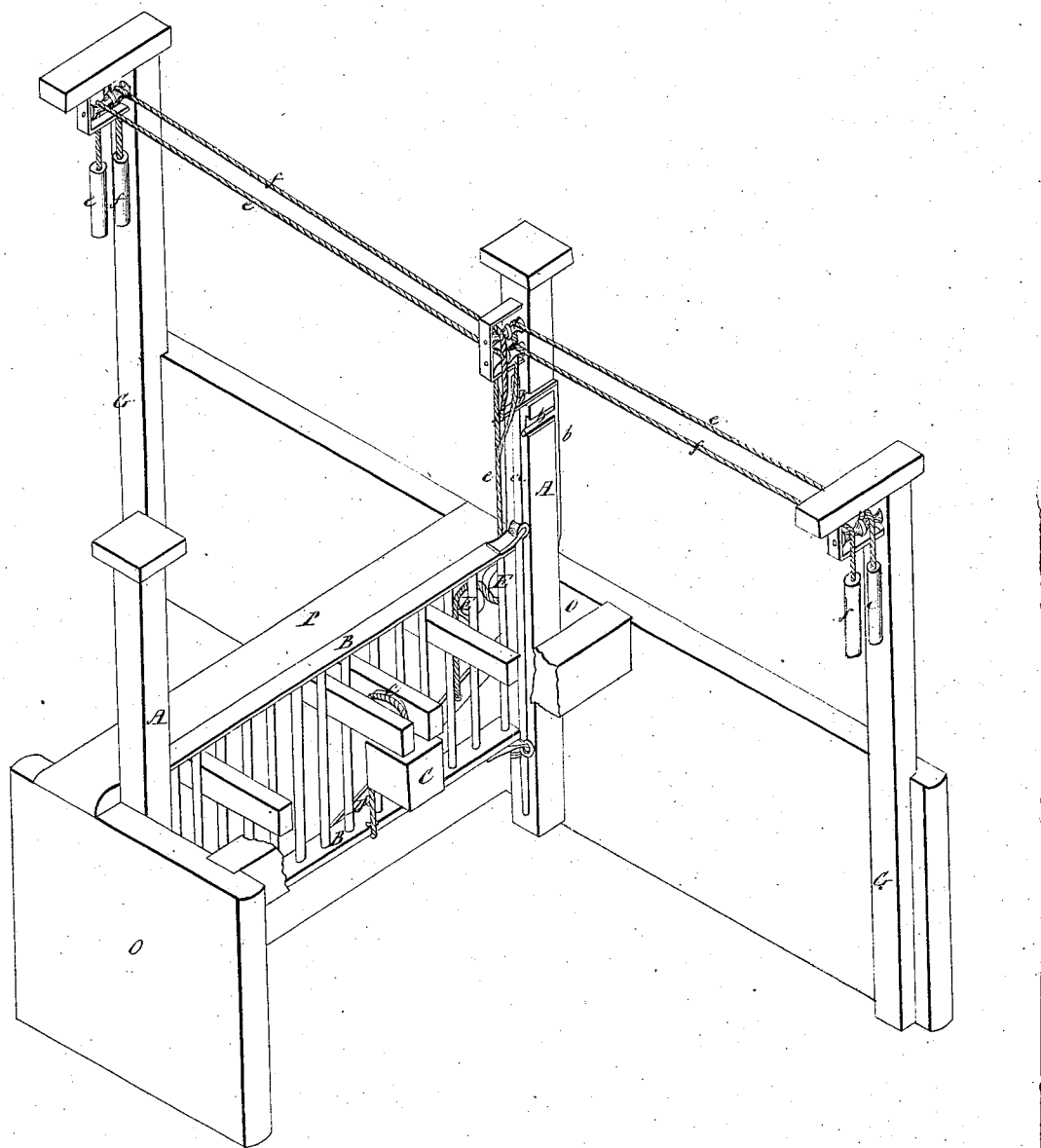

JOHN A. BURCHARD, OF BELOIT, WISCONSIN.

Letters Patent No. 64,945, dated May 21, 1867

GATES.

*The Schedule referred to in these Letters Patent and making part of the same.*

TO ALL WHOM IT MAY CONCERN:

Be it known that I, JOHN A. BURCHARD, of the city of Beloit, county of Rock, and State of Wisconsin, have invented certain new and useful improvements in Farm and Carriage Gates; and I do hereby declare that the following is a full and exact description thereof, reference being had to the accompanying drawing, and to the letters of reference marked thereon, and making a part of this specification.

Similar letters of reference indicate like parts.

O O is the vault, the walls of which may be constructed of stone, brick, or other suitable material, into which the gate is depressed when open for the passage of vehicles, said vault being of suitable length, width, and depth to accommodate the gate and its equipments, and to allow free access to the same for the purpose of making necessary repairs. C is a weight, for the purpose of assisting in raising or closing the gate B. D is a lever, actuated by the cords $e\ e$, for the purpose of closing the gate, said lever being pivoted to the bottom bar of the gate, equidistant from the ends, and to the right-hand post A. E E are pulleys used in operating the lever D by the said cords $e\ e$. $b\ b$ is a spring-latch for holding the gate in position when closed. $f f$ are cords used to operate the spring-latch $b\ b$, by releasing which the gate is permitted or caused to open of its own gravity. A A are the posts of the gate, having tracks $a\ a$ on the inner surface, on which the pulleys at each corner of the gate traverse freely in opening and closing. The gate is opened by actuating the cord $f$, and closed by operating the cord $e$, said cords passing over pulleys H H attached to the posts G G. P is a platform covering the vault, and forming the roadway, in which a suitable opening is provided, through which the vertical rods, of which the gate is formed, work freely in opening and closing. Said platform may be supported by suitable girders of iron or wood, the top surface of said platform being made sufficiently convex, so as to shed water or sleet, and prevent it from going into the vault. The top bar of the gate being wide enough to close the opening in the platform, thus preventing the ingress of dirt in the passage of vehicles or animals.

What I claim as my invention, and desire to secure by Letters Patent, is—

An improved farm and carriage gate, when constructed and operated substantially as set forth, and for the purpose specified, in combination with the vault O O, weight C, lever D, pulleys E E, tracks $a\ a$, cords $e\ f$, latch $b$, pulleys H H, posts A A G G, and platform P.

JOHN A. BURCHARD.

Witnesses:
R. TATTERSHALL,
D. W. C. CASTLE.